340-552 SR

3/22/88 XR RE 32,627

United States Patent [19]

Humble et al.

[11] E Patent Number: Re. 32,627

[45] Reissued Date of Patent: Mar. 22, 1988

[54] ELECTRICAL SURVEILLANCE APPARATUS WITH MOVEABLE ANTENNA ELEMENTS

[75] Inventors: David R. Humble, Deerfield Beach; Jon N. Weaver, Boca Raton; David L. Gentzler, Boynton Beach; Ezra D. Eskandry, Pompano Beach; Peter J. Lamanna, Boca Raton, all of Fla.

[73] Assignee: Sensormatic Electronics Corporation, Deerfield Beach, Fla.

[21] Appl. No.: 757,012

[22] Filed: Jul. 19, 1985

Related U.S. Patent Documents

Reissue of:

[64] Patent No.: 4,394,645
Issued: Jul. 19, 1983
Appl. No.: 337,990
Filed: Jan. 8, 1982

U.S. Applications:

[63] Continuation-in-part of Ser. No. 301,038, Sep. 10, 1981, abandoned.

[51] Int. Cl.[4] ..... G08B 18/00; G08B 22/00

[52] U.S. Cl. ..... 340/572; 340/551; 340/552

[58] Field of Search ..... 340/572, 551, 552; 455/51

[56] References Cited

U.S. PATENT DOCUMENTS

| | | | |
|---|---|---|---|
| 3,697,972 | 10/1972 | Brown | 340/551 |
| 3,868,669 | 2/1975 | Minasy | 340/572 |
| 3,895,368 | 7/1975 | Gordon et al. | 340/572 |
| 4,139,844 | 2/1979 | Reeder | 340/572 |
| 4,212,002 | 7/1980 | Williamson | 340/572 |
| 4,251,808 | 2/1981 | Lichtblau | 340/572 |
| 4,260,990 | 4/1981 | Lichtblau | 340/572 |
| 4,309,697 | 1/1982 | Weaver | 340/551 |

FOREIGN PATENT DOCUMENTS

| | | | |
|---|---|---|---|
| 763681 | 2/1934 | France | 340/572 |
| WO80386 | 3/1980 | PCT Int'l Appl. | |

OTHER PUBLICATIONS

"Access Control System . . . hands-free", N.V. Nederlandsche, Holland.

*Primary Examiner*—Glen R. Swann, III
*Attorney, Agent, or Firm*—Robin, Blecker & Daley

[57] ABSTRACT

A continuous loop transmitting winding assembly is disposed in one panel and a vertically oriented figure eight receiving coil winding assembly is disposed in a second panel, the two panels being mounted on pivots for swinging gate type movement straddling the pathway to be controlled by a magnetic surveillance system. This arrangement confines the surveillance field to the pathway and tends to follow the passage of an object bearing a marker therealong. No marker detecting backfield is generated. Alternatively, one winding assembly is moveable while the other is stationary thereby similarly confining the field.

Special winding configurations are used to reduce interference from third harmonic signals produced in adjacent metallic counters. The arrangement also imposes immunity to signals emanating from cash registers, motors and the like.

Door and single gate mounted magnetic and microwave surveillance systems are also disclosed.

16 Claims, 14 Drawing Figures

Fig. 4.
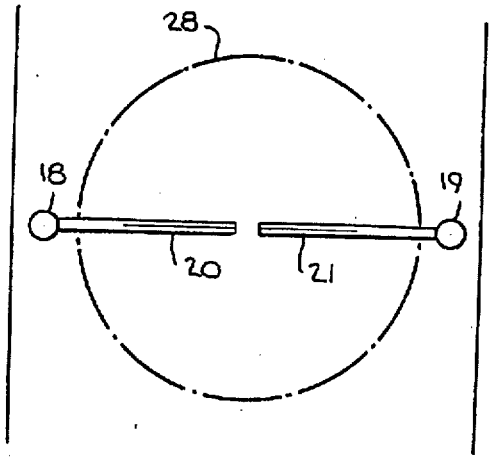
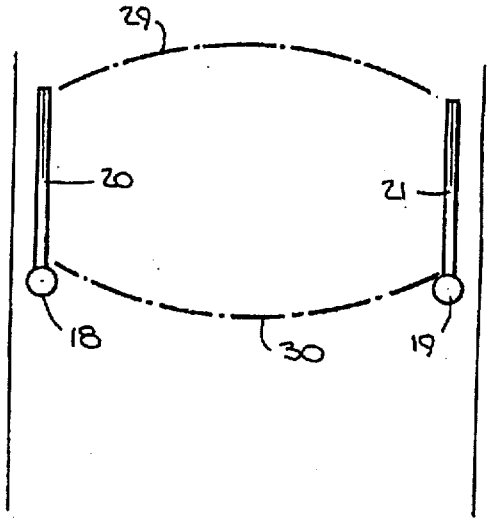
Fig. 5.
Fig. 6.
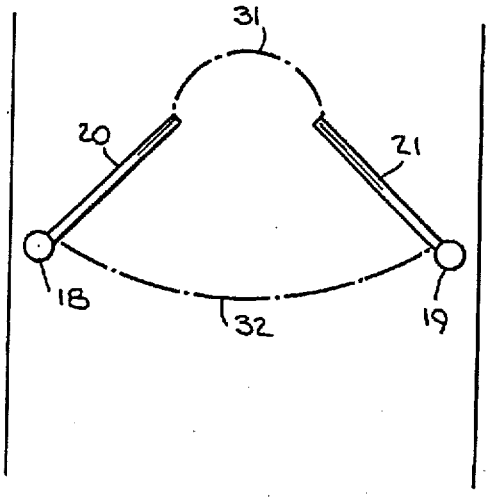

Fig. 9.
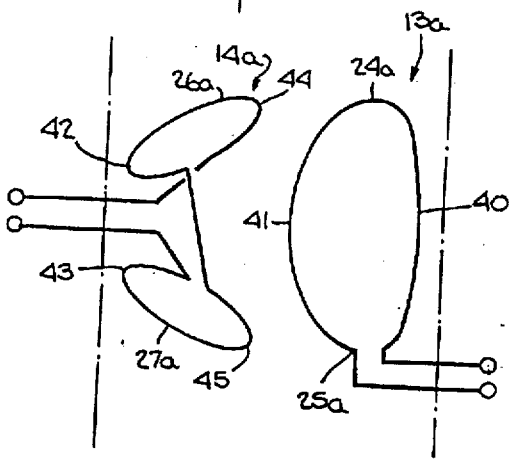
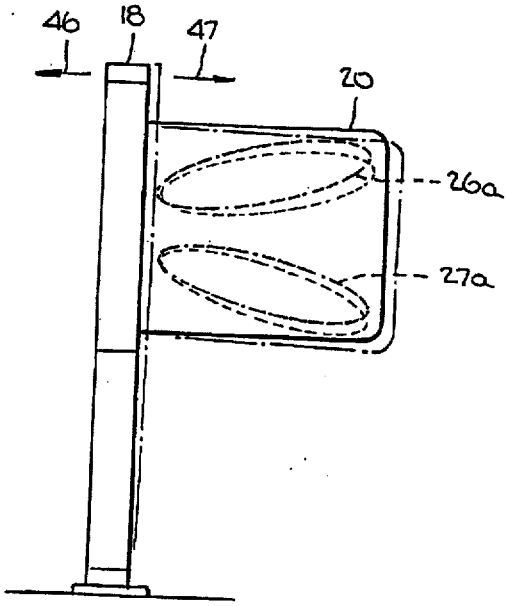
Fig. 10.
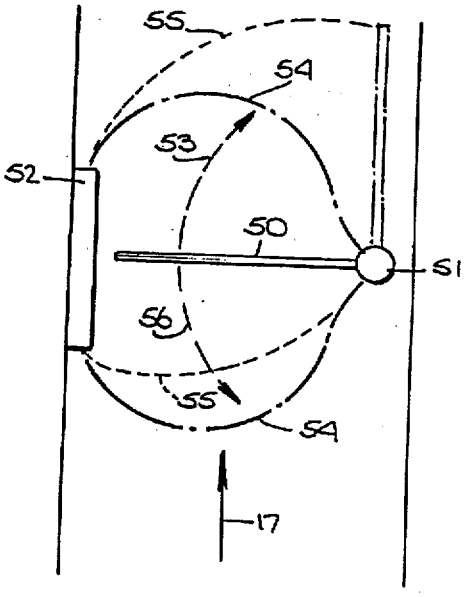
Fig. 11.

ELECTRICAL SURVEILLANCE APPARATUS WITH MOVEABLE ANTENNA ELEMENTS

Matter enclosed in heavy brackets [ ] appears in the original patent but forms no part of this reissue specification; matter printed in italics indicates the additions made by reissue.

CROSS REFERENCE TO A RELATED APPLICATION

This application is a continuation-in-part of application Ser. No. 301,038, filed Sept. 10, 1981, entitled "Magnetic Surveillance Apparatus With Moveable Coil Elements", now abandoned.

BACKGROUND OF THE INVENTION

The present invention relates to apparatus for detecting the presence of an object within a surveillance zone and, more particularly, to apparatus employing either a varying magnetic field for detecting a body of high permeability material or a microwave field for detecting a suitable receptor-reradiator.

Surveillance systems based upon detection of high permeability materials have been known publicly since at least as early as May 4, 1934 when French Pat. No. 763,681, granted to Pierre Arthur Picard, was published. Essentially, said patent describes apparatus wherein a first winding or coil, the transmitting coil, is powered by a source of alternating current, and a second winding or coil, the receiving coil, is disposed in registration with the first coil and coupled to a filtered detecting circuit. One of the coils is in the shape of a figure eight while the other is rectangular and encircles the figure eight coil. Picard refers to this arrangement as an "electrodynamic balance" since in the absence of a disturbance within the generated field there will be zero net energy transferred between the two coils.

Considerable effort has been directed toward improving upon both the system electronics and the field coupling coils as disclosed in said Picard patent. With regard to the electronics, reference may be had to U.S. Pat. No. 4,309,697, issued Jan. 5, 1982, to John N. Weaver, filed Oct. 2, 1980 for "Magnetic Surveillance System With Odd-Even Harmonic and Phase Discrimination," and assigned to the same assignee as the present invention. There is described therein an improved system of the foregoing magnetic field type wherein the apparatus creates a surveillance field varying sinusoidally at a fundamental frequency. Parallel filter channels select the second and third harmonic components of the perturbations created by the high permeability material (sometimes referred to as a marker) when present in the field, and the phase of the second harmonic relative to a reference signal is compared. The signal level of each of the second and third harmonic components as well as the aforesaid phase congruency cooperatively control an alarm circuit.

While various attempts have been made to improve upon the coil elements, they all, with but one exception, rely upon placing the coils in fixed positions generally parallel to, either on the same side or on opposite sides of, a pathway to be guarded. The problem associated with fixed or stationary coils is that they must be able to transmit to and receive from a three dimensional space, the surveillance zone, in a homogeneous manner. Heretofore, this has been accomplished by increasing the transmitting power. Unfortunately, the greater the power the more difficult it becomes to limit the field to the desired zone. A "backfield" area is developed which gives rise to detection of markers outside of the desired zone. Such increased power also demands that large ferrous objects and certain electronic instruments be located a substantial distance from the coils. This constraint limits the usefullness of such systems where items with markers attached must be kept in close proximity to the coils. Moreover, most retail establishments where this type of system could be otherwise used to advantage have checkout counters constructed of large, thin sheets of ferrous material. In such locations no significant "backfield" can be tolerated.

When the "backfield" is reduced by reducing transmitter power, sensitivity of marker detection is sacrificed. Entire regions within the intended surveillance zone will have insufficient field intensity to accomplish detection. At least such was the case prior to the present invention.

Further by way of background said Picard patent states that it is possible to cause the person who is liable to steal an object to pass into the interior of one of two balanced coils, but that a better arrangement would consist in forcing the thief to pass very close to one side of the door comprising the windings. For example, one can mount the frames in the turning portion of a revolving door. Unfortunately, said Picard patent contains no illustration or description as to how such modification might be accomplished and the reader is left to conjecture as to how an operative embodiment might be constructed. It can only be assumed that the intent of the patentee was to utilize a coil geometry of the type described elsewhere in his patent. Thus, it would appear to be in the form of one figure eight coil surrounded by an encircling winding all in the same plane. Designs of this type where transmitting and receiving coils lie within one another in the same plane are characterized by a backfield equal to the front field and by significant edge fields normal to the coil axes that can produce detection of markers.

Numerous deficiencies can be found in the Picard disclosure. First, the usual revolving door normally is constructed with glass panels mounted within metal frames secured to a center post. A metal frame in this environment could provide a short circuit loop surrounding the surveillance coils interfering with their operation. Overranging would extend beyond the confines of the cylindrical portion of the door casement. Hence, the adjacent room area would be swept by the field as the door revolves. Moreover, a revolving door is intended as an interface between the interior and exterior of a room or space and is not particularly suited for apprehension of stolen goods or thieves. It also has physical limitations unsuited to the passage of wheelchairs or shopping carts, for example.

With the foregoing in mind, it is one object of the present invention to provide an improved apparatus of the foregoing general type capable of covering a narrow corridor or passageway with essentially no backfield sensitivity such as might be used in the space between checkout counters in a modern supermarket.

Another object of the present invention is to provide a magnetic surveillance system that can be employed in association with a supermarket checkout counter or the like for controlling the checkout lane while manifesting immunity to interference from adjacent cash registers and other electrical apparatus as well as from harmonic interference generated in the metal of the counters.

Besides using high permeability markers for surveillance, systems are known that make use of the signal mixing and reradiation capability of a semiconductor diode. As an example, reference can be had to Gordon et al. U.S. Pat. No. 3,895,368, issued July 15, 1975, for "Surveillance System and Method Utilizing Both Electrostatic and Electromagnetic Fields," and assigned to the same assignee as the present invention. Said patent describes a system wherein a microwave signal generator projects an electromagnetic wave into a space under surveillance to establish a first field. A pulse or frequency modulated low frequency generator is used to apply a voltage to a discontinuous conductor for establishing a second field, electrostatic in nature, throughout the space. Presence in the space of a miniature passive electromagnetic wave receptor-reradiator in the form of a semi-conductive diode connected to a dipole antenna causes the reradiation of the low frequency component modulated on the microwave component as a carrier. The front end of a receiver system is tuned to the microwave frequency and feeds a suitable detector circuit responsive to the low frequency signal. A coincidence circuit energizes an alarm circuit whenever the detected signal coincides with the original modulation envelope being applied to the low frequency generator. The discontinuous conductor may be a foil sheet or the like.

In said Gordon et al. patent it is contemplated that the discontinuous conductor as well as the usual antennas for transmitting and receiving the microwave signal are all mounted in one or more stationary pedestals or the like. We are not aware of any prior suggestion that the antennas might be moveable. However, in order to limit the surveillance zone to a confined region while maintaining reliable detection there are certain situations for which the known systems are inadequate.

It is, therefore, a further object of the present invention to provide an improved microwave surveillance system capable of covering a confined region with increased reliability.

SUMMARY OF THE INVENTION

In accordance with the present invention there is provided apparatus for detecting the presence within a surveillance zone of an electrical energy responsive marker wherein a transmitter is coupled to an electrical energy field radiator for establishing throughout said zone an AC energy field, and a receiver is coupled to an electrical energy field receptor for detecting a predetermined alteration of said AC energy field caused by the presence of said marker within said AC energy field, characterized in that at least one of said radiator and receptor is disposed in a gate-like structure that is mounted for rotation to and fro about a vertical axis with substantially all of said structure extending horizontally to one side of said axis.

BRIEF DESCRIPTION OF THE DRAWINGS

The invention will be better understood after reading the following detailed description of the presently preferred embodiments thereof with reference to the appended drawings in which:

FIG. 4 is a diagrammatic view showing the field sensitivity pattern when the apparatus of FIG. 1 is in its standby position;

FIG. 5 is a view similar to FIG. 4 but showing the field pattern when the gate members of the apparatus of FIG. 1 are spread apart into parallel disposition;

FIG 6 is a view similar to FIG. 4 showing the field pattern for an intermediate orientation of the gate members;

FIG. 9 is a schematic diagram illustrative of another arrangement of the coils incorporated within the apparatus of FIG. 1;

FIG. 10 is a vertical elevational view of one of the panel structures of FIG. 1 showing the cause of one form of undesired signal disturbance;

FIG. 11 is a diagrammatic view illustrative of a further embodiment of the present invention;

The same reference numerals are used throughout the drawings to designate the same or similar parts.

DESCRIPTION OF THE PREFERRED EMBODIMENTS

Figure 8:
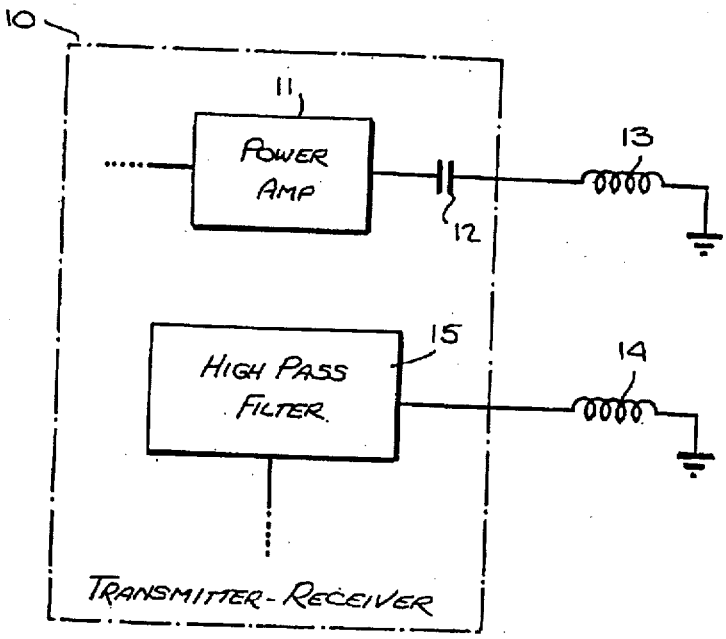
FIG. 8 is a schematic diagram illustrative of the overall system of FIG. 1.

Referring first to FIG. 8, there is shown therein in abbreviated form the principal components of a surveillance system of the magnetic type designed to produce an AC magnetic field within a surveillance zone and to detect any disturbance to said field caused by the presence of a body of high permeability material therein. For a description of the complete system reference should be had to the aforementioned U.S. Pat. No. 4,309,697. As seen in FIG. 8 hereof, the system consists of a transmitter-receiver arrangement 10 containing a power amplifier 11 whose output is connected through a capacitor 12 to a transmitting coil 13, the free terminal of which is connected to ground. As explained in the aforesaid Weaver patent, the capacitor 12 tunes the coil 13 to resonance at the frequency produced by the power amplifier. A receiving coil 14 with one terminal connected to ground has its other terminal connected to the input of a high pass filter 15. The remainder of the circuit is not shown herein as it forms no part of the subject invention. It is observed, however, that when comparing the circuit of FIG. 8 with the complete circuit shown in FIG. 4 of the aforesaid Weaver patent, the single transmitting coil 13 in the subject application takes the place of a pair of coils in the patent while the receiving coil 14 herein takes the place of a pair of coils in the aforesaid patent. In all other respects the circuit system may be identical.

Figure 1:
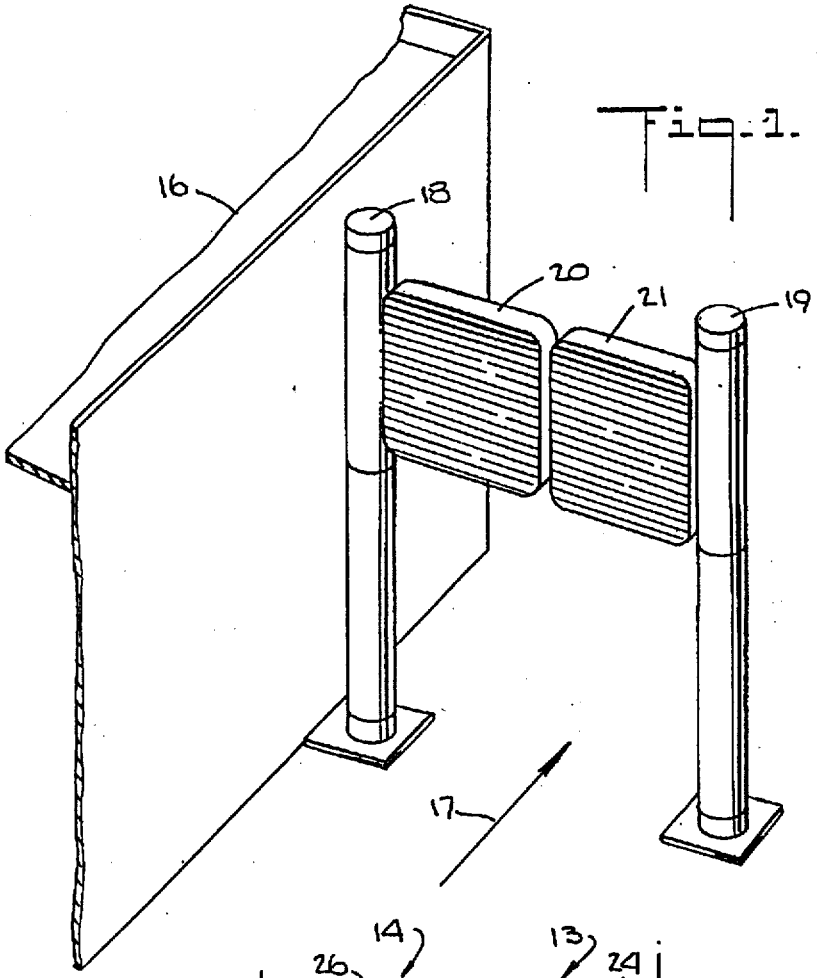
FIG. 1 is a perspective view showing a typical installation of apparatus incorporating the present invention.

Now turning to FIG. 1 of the instant application, there is shown a typical checkout counter 16 with its associated exit pathway indicated by the arrow 17. Positioned on opposite sides of the pathway 17 are two stanchions 18 and 19 pivotally mounting respective panel structures 20 and 21. The panel structures 20 and 21 are arranged to move as swinging gates about the stanchions 18 and 19 serving as the axes therefor, respectively. Movement is as represented by the broken line arrows 22 and 23 shown in FIG. 3. Suitable biasing means, not shown, causes the panel structures 20 and 21 to assume a standby orientation as shown in FIG. 1 extending across the space between the axes represented by the stanchions 18 and 19 transverse to the path of any body traversing the exit pathway 17. As shown in FIG. 1, the panel structures 20 and 21 extend toward each other in a common vertical plane such that they must be swung out of the way in order to permit a shopping cart or individual to pass therebeyond.

Each of the panel structures 20 and 21 houses one of the coil elements 13 or 14 that constitute part of the surveillance apparatus previously described. Since the gate arrangement shown in FIG. 1 is symmetrical it is immaterial from a structural standpoint which panel contains which coil. However, for reasons to be explained below, collateral considerations may dictate which panel contains the transmitting coil and which contains the receiving coil.

Figure 2:
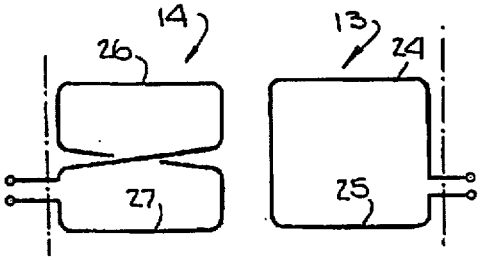
FIG. 2 is a schematic diagram illustrative of one arrangement of the coils incorporated within the apparatus of FIG. 1.

For the sake of illustration, it may be assumed that the panel structure 20 contains the receiving coil 14 while the panel structure 21 contains the transmitting coil 13. Referring to FIG. 2, it will be seen that the transmitting coil 13 is in the form of a substantially square loop having top and bottom sections 24 and 25 respectively while the receiving coil 14 is in the form of a figure eight having top and bottom portions 26 and 27, respectively. In accordance with known precepts the figure eight coil 14 has electrically balanced upper and lower halves and is oriented vertically as shown in FIG, 2 such that there is no net signal received from the transmitting coil 13 in the absence of an external disturbance to the field generated by coil 13. All of the turns of the coil 13 encircle a central point in the same direction and with symmetry about both a vertical and a horizontal axis passing through said point. As mentioned, the coil element 14 is configured as a vertically oriented figure eight with the upper and lower halves of the eight electrically balanced with respect to undisturbed magnetic field signals received directly from the first coil element 13. The coil elements, as clearly shown in FIG. 2, have substantially equal external dimensions and outer boundary shape. However, subject to the foregoing constraints, both coils 13 and 14 may be modified in shape. For example, the outer boundary may be rectangular rather than square.

When the panel structures 20 and 21 are in their standby positions as shown in FIG. 1, and the surveillance system is energized, the effective field extending between coils 13 and 14 for detecting the high permeability material bodies will have a boundary substantially as shown by the broken line 28 in FIG. 4. That is, the boundary 28 shown in FIG. 4 is for the horizontal plane extending through the midpoint of the windings 13 and 14. For the same plane when the panel structures 20 and 21 are swung outward to the parallel position shown in FIG. 5 the field boundary will be somewhat as shown by the broken lines 29 and 30. As the panel structures 20 and 21 approach each other, the field boundary in the horizontal plane will be somewhat elongated in the direction of the passageway 17 with boundaries 31 and 32 as shown in FIG. 6.

Figure 7:
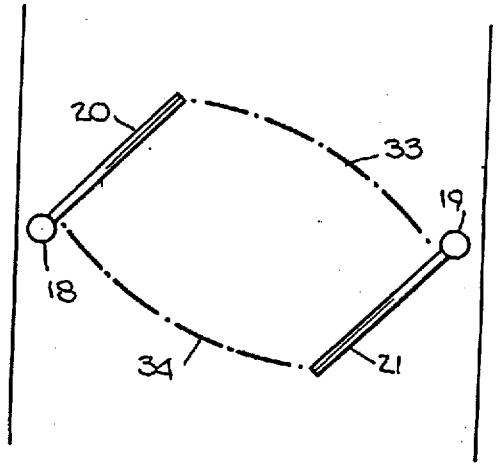
FIG. 7 is a view similar to FIG. 4 showing the field coverage when the gate members are moved in opposite directions.

One other general relationship between the panel structures 20 and 21 is that as shown in FIG. 7. Here the panel structures have been moved in opposite directions but are still effective to establish a magnetic field therebetween having a horizontal boundary as shown by the broken lines 33 and 34. If the phase detector arrangement responds only to the magnitude of the phase coherence or lack of coherence and is not sensitive to the direction of the phase displacement, the relationship shown in FIG. 7 of the coil windings will be just as effective to detect the intrusion of a high permeability body as will the orientations shown in FIGS. 4, 5 and 6.

While the receiving coil or winding 14 is referred to as having a configuration of a figure eight, it should be apparent that it may be constructed of two identical coils connected so as to generate equal but opposing currents and voltages when a common mode signal is encountered. That is, when each of two coils is linked by equal strength magnetic flux passing therethrough in the same direction.

Depending upon the construction and materials of the counter 16 in FIG. 1 it may be found that when the coil configurations shown in FIG. 2 are utilized, interfering harmonic signals, particularly of the third harmonic, will be caused to emanate from the counter. Placing the transmitting coil on the side away from the counter helps to reduce the counter generated interference but does not eliminate it for power levels and sensitivity necessary to detect reliably markers carried along the aisle. It has been found, however, that improved immunity to such interference is obtained with the coil configurations shown in FIG. 9 to which attention should now be directed. For convenience is relating the structure of FIG. 9 to that of FIG. 2, the same reference numerals used in FIG. 2, where applicable, are used to FIG. 9 with the letter "a" appended thereto. Thus, the transmitting coil is designated 13a and is disposed within gate or panel 21 while panel 20 contains receiving coil 14a, here shown composed of two distinct loops 26a and 27a, but interconnected as a figure eight coil.

Figure 3:
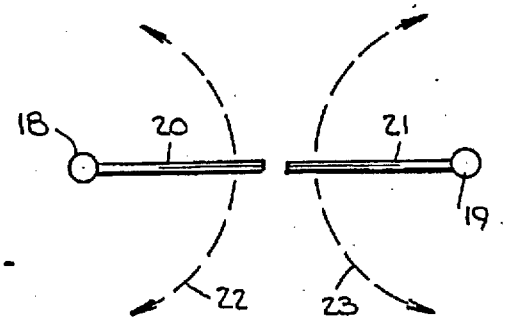
FIG. 3 is a diagrammatic view illustrative of an aspect of the operation of the apparatus of FIG. 1.

The transmitting coil 13a is of generally planar pancake construction configured as a loop with its plane oriented vertically when disposed in panel 21. All of the turns of looop 13a encircle a central point in the same direction with mirror symmetry about a horizontal axis passing through said point, but with each section of loop 13a on opposite sides of a vertical axis passing through said point being of generally elliptical shape with section 40 having a greater radius of curvature than the section 41. The section 41 of lesser radius of curvature is disposed on that side of said vertical axis that places it closer than section 40 to the receptor coil 14a when the panels 20 and 21 assume their standby orientation as shown in FIG. 3.

The receptor or receiving coil 14a has a pair of substantially identical coil elements 26a and 27a of generally planar pancake construction configured as loops in a common vertical plane, all of the turns of each loop 26a and 27a encircle a respective central point in one direction, each loop being generally elliptical in shape, as shown, with a major and minor axis. The loops 26a and 27a are disposed one above the other in said vertical plane and connected to form a figure eight type coil. The major axes of loops 26a and 27a are positioned equidistant from on opposite sides of the plane containing the horizontal axis, previously mentioned, of the coil 13a, said major axes diverging, as shown, in a direction toward the coil 13a when the panels 20 and 21, containing coils 14a and 13a, assume the standby orientation of FIG. 3.

The rationale behind the configuration of FIG. 9 will now be explained. Particularly in a supermarket environment there exist two distinct sources of interference. One results from the inherent nature of the steel in the checkout counters that produces a third harmonic signal when exposed to the magnetic field from the transmitting coil. Since the receiving coils must be located very close to the counter they are linked by even weak fields emanating from the counter. The effect of such interference is reduced by making the coils 26a and 27a as small as possible consistent with the desired detection sensitivity in the aisle. Canting the coils, as shown, is dictated by the fact that reducing the vertical separation between the ends 42 and 43 of coils 26a and 27a, respectively, reduces the net signal detected from the counter, while increasing the spread of the ends 44 and 45 of coils 26a and 27a, reduces the direct coupling with the transmitting coil 13a and reduces the common mode rejection of any signal derived from a marker near the far side 40 of coil 13a.

The transmitter coil 13a, on the other hand, is configured to minimize the dead area within the boundary of the coil and to increase the effective flux directed toward the aisle as opposed to that directed toward the back counter (not shown in the drawings).

A further advantage of reducing the size of coils 26a and 27a is to reduce the reception of unwanted signals from the usual cash register and conveyor belt motors located at the counter. At the same time, direct reception from the coil 13a is reduced. One further advantage can be explained with reference to FIG. 10. Should the stanchion 18 vibrate in the direction shown by the arrows 46 and 47 the coils 26a and 27a will alter their relative positions with respect to coil 13a unbalancing the common mode rejection. Smaller coils minimize this effect.

It should be understood from the foregoing that a careful compromise must be reached depending upon the environment and on the surveillance region that the system is intended to cover effectively.

While the embodiments described so far include a double gate arrangement with the transmitting and receiving coils both mounted for rotation, certain environments will permit use of an arrangement as shown in FIG. 11. In this embodiment only one of the coils, radiator or receptor, is mounted for movement in the gatelike panel or structure 50. The drawing represents top view and shows the panel 50 mounted for rotation about a vertical axis 51. The coil assembly (not shown) within panel 50 cooperates with a stationary coil assembly in an enclosure 52 mounted directly opposite the axis 51. For movement of panel 50 in the direction of the arrow 53, the effective field boundary will shift from that shown by the broken lines 54 to that shown by the broken lines 55. Obviously, if panel 50 were swung backwards in the direction of arrow 56, the field boundary would become a mirror image of that represented by lines 55.

It should be apparent from the foregoing that there has been provided a mounting arrangement for the transmitting and receiving coil elements of the surveillance system that fully covers the area of the passageway or zone to be protected while conveniently permitting passage of shopping carts or wheelchairs or the like. Separating the receiving and transmitting coils so that they are not contained one within the other, provides a marker detection region totally confined to the passageway between the pivot axes 18 and 19 that straddle the pathway 17, or between the axis 51 and the panel 52 for the embodiment of FIG. 11. Such confinement of marker detection is of ultimate importance when the system is used in the high density checkout areas of modern retail stores or supermarkets. The described arrangement permits detection of markers within the passageway 17 but will not detect markers attached to merchandise on the top of the checkout counter 16 or displayed on racks or shelves exterior to the passageway. Large bodies of ferrous material in the counter construction will have no significant effect on the system performance. This is true even if the stanchions 18 and 19 are omitted and the panel structures 20 and 21 are pivotally mounted directly on the walls of the checkout counters. The ability of the coil windings to rotate about an axis virtually eliminates the likelihood of the existence of voids wherein marker detection will not occur. As a consequence, less transmitter power can be used to provide marker detection within a given three dimensional space. The use of independent panel structures containing the transmitter and receiver windings, respectively, permits the passage of a shopping cart or even a baby carriage followed by a partial closure into contact with the individual pushing the wheeled vehicle therebetween. Such action greatly improves marker detection reliability.

Heretofore, when the surveillance was to be maintained at a doorway, resort was had to stationary pedestals or columns stationed on each side of the exitway. Such arrangement is satisfactory for large establishments where articles bearing markers can be kept at a safe distance beyond any back field of the system. But in smaller areas it becomes necessary to further confine the effective surveillance region and this is best done by reducing the power furnished to the radiator. Unfortunately, this requires reducing the spacing between the pedestals or columns and such solution is not always acceptable. As an alternative, resort may be had to the arrangement illustrated in FIG. 12.

Figure 12:
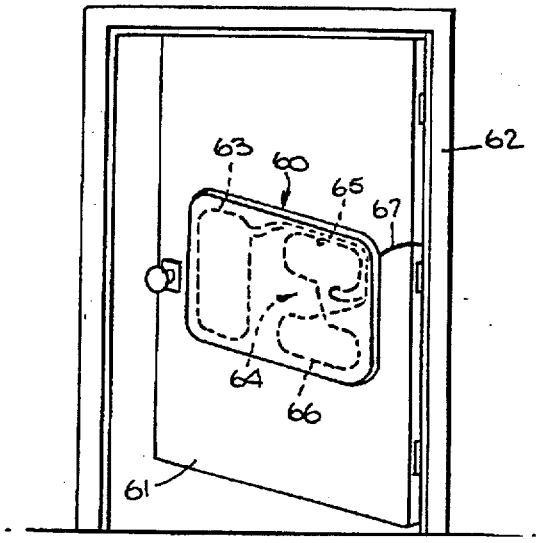
FIG. 12 is a view of a side hinged door provided with a magnetic type embodiment of the present invention.

As seen in FIG. 12, an enclosure 60 is mounted on one face of a hinged door 61 controlling passage through the doorway 62. Within enclosure 60 are mounted coils 63 and 64, side-by-side. The coil 63 is similar to coil 13 of FIG. 2 while the coil 64 is similar to coil 14 of FIG. 2. That is, coil 64 consists of two coils or loops 65 and 66, oriented as shown, connected together to constitute a figure eight coil assembly. The coils 63 and 64 are connected by shielded cables 67 to the electronic apparatus of the system, not shown in the drawings.

When door 61 is provided with the usual door check it will articulate to and fro through an arc no greater than 180°, generally less, depending upon the intervention of pedestrians seeking to pass through the doorway. By locating the coils 63 and 64 side-by-side and operating them in the system of FIG. 8, a surveillance field will be established both directly in front and directly in back of the enclosure 60. Very little effective edge field will be produced. That is there will be little effective field radiated either toward the doorknob or the door hinges. Yet, as the door is opened, the surveillance zone will move in a sweeping arc ensuring efficient coupling with any marker carried through the doorway 62. This will be true regardless of the direction in which the marker is transported through doorway 62. If the person carrying the marker is coming from the far side of door 61 toward the observer as seen in FIG. 12, the door will close behind and closely follow the person as the latter passes through doorway 62.

Figure 13:
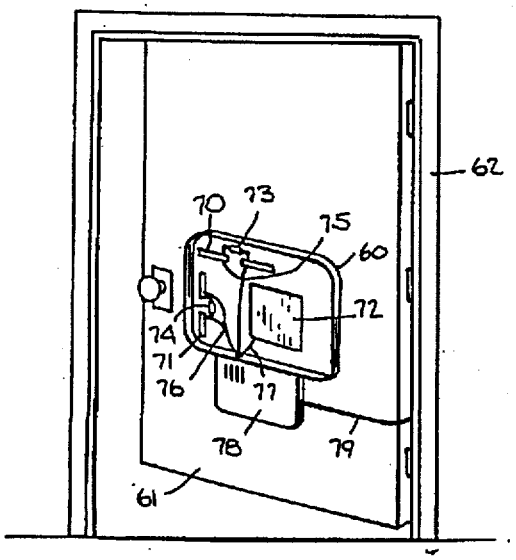
FIG. 13 is a view similar to FIG. 12 but showing the door provided with a microwave embodiment of the invention.

The present invention is also applicable to the microwave type of surveillance devices. Thus, as shown in FIG. 13, the coils of FIG. 12 are replaced, within the enclosure 60 whose cover has been removed for clarity, by a pair of dipole antennas 70 and 71 and an electrostatic field radiator 72. The dipole junctions are each bridged by a suitable inductor 73 and 74, respectively, and are connected by shielded cables 75 and 76 to the electronics within the housing 78 to which power is furnished over cable 79. Similarly, foil or conductive layer 72 is connected to the system by a shielded cable 77. The electronic system may be substantially the same as that described in the aforesaid Gordon et al. patent with the dipole antennas 70 and 71 operating in parallel off a diplexer for both transmission and reception or with one dipole used for transmission and the other for reception. The effective surveillance zone will be both in front of and behind the antenna assembly shown in FIG. 13 and will sweep an arcuate region as the door is opened and closed. With appropriate shielding the dipole antennas, for example, can be caused to radiate substantially all effective signals to one side of door 61. Parabolic reflectors can be used for this purpose. The significant advantage of this embodiment is that the power to the equipment can be reduced over that used with pedestal or stationary equipment while not sacrificing the ability to detect tags transported through doorway 62. While dipole antennas are shown in this embodiment, it will be understood that other known r.f. radiators can be substituted.

Figure 14:
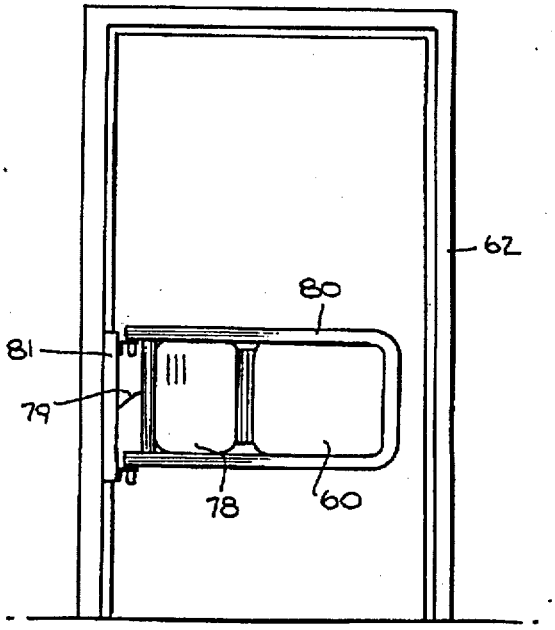
FIG. 14 is a view of a doorway in which the invention is embodied in a hinged gate.

In FIG. 14, the antenna structure of FIG. 13 within enclosure 60, and the housing 78 containing the electronic circuitry, are shown mounted within a frame 80. The door 61 is no longer present and the frame 80 is pivotally mounted at 81 to the door frame 62. Frame 80 provides a gate that is mounted, as mentioned, for to and fro movement to thereby sweep the pathway through doorway 62.

Unless the context indicates otherwise, it is to be understood that reference to a coil or winding herein in the singular is not intended to be taken as an express limitation, but that plural loops or windings may be interconnected as will be apparent to one skilled in the subject art, to form an assembly that functions as the coil or winding in question. It should also be apparent that the invention is applicable to a wide variety of surveillance systems for detecting an electrical energy responsive marker whether it be one of high permeability material or a semiconductor diode or the like.

Having described the invention with reference to the presently preferred embodiments thereof, it will be understood by those skilled in the subject art that various changes in construction and materials can be effected without departing from the true spirit of the invention as defined in the appended claims.

What is claimed is:

1. Apparatus for detecting the presence within a surveillance zone of an electrical energy responsive marker wherein a transmitter is coupled to an electrical energy field radiator for establishing throughout said zone an AC energy field, and a receiver is coupled to an electrical energy field receptor for detecting a predetermined alteration of said AC energy field caused by the presence of said marker within said AC energy field, characterized in that at least one of said radiator and receptor is disposed in a gate-like structure that is mounted for rotation to and fro about a vertical axis with substantially all of said structure extending horizontally to one side of said axis, *at least one of said radiator and receptor being movable relative to the other thereof in said structure, said structure being constrained to assume a standby orientation in a vertical plane centrally of such to and fro rotation.*

2. Apparatus according to claim 1, characterized in that each of said radiator and receptor is disposed in a separate gate-like structure that is mounted for rotation to and fro about a respective vertical axis with said axes spaced apart, substantially all of each said structure extending horizontally to one side of its respective axis, and said structures are constrained to assume a standby orientation extending toward each other in a common vertical plane.

3. Apparatus according to claim 2, characterized in that said radiator comprises a coil element of generally planar pancake construction configured as a loop with its plane oriented vertically and all of its turns encircling a central point in the same direction with mirror symmetry about a horizontal axis passing through said point, each section of said loop on opposite sides of a vertical axis passing through said point being of generally elliptical shape with one of said sections having a greater radius of curvature than the other, and said section of lesser radius of curvature is disposed on the side of said vertical axis that places it closer to said receptor than said section of greater radius of curvature when said structures assume said standby orientation.

4. Apparatus according to claim 3, characterized in that said receptor comprises a pair of substantially identical coil elements of generally planar pancake construction configured as loops in a common vertical plane, all of the turns of each receptor loop encircle a respective central point in one direction, each loop being generally elliptical in shape with a major and minor axis, said loops being disposed one above the other in said plane and connected to form a figure eight type coil, the major axes of said loops being positioned equidistant from and on opposite sides of the plane containing the horizontal axis of said radiator coil element, said major axes diverging in a direction toward said radiator coil element when said structures assume said standby orientation.

[5. Apparatus according to claim 1, characterized in that both said radiator and receptor are disposed in the same gate-like structure.]

[6. Apparatus according to claim 5, characterized in that said radiator and receptor comprise first and second coil elements, respectively, said coil elements being of generally planar pancake construction disposed side-by-side horizontally in a common vertical plane, said first coil element being configured as a loop with all of its turns encircling a central point in the same direction and with mirror symmetry at least about a horizontal axis, and said second coil element being configured as a vertically oriented figure eight with the upper and lower halves of the eight electrically balanced with respect to undisturbed magnetic field signals received directly from said first coil element when the latter is energized with an AC signal.]

[7. Apparatus according to claim 5, characterized in that said radiator and receptor comprise at least one dipole microwave antenna for radiating and receiving a microwave carrier signal, and a layer of conductive material for radiating an electrostatic field signal.]

[8. Apparatus according to claim 7, characterized in that said radiator comprises a first dipole microwave antenna for radiating said microwave carrier signal, and said receptor comprises a second dipole microwave antenna disposed orthogonally to said first dipole antenna for receiving from any said marker said microwave carrier signal with said electrostatic field signal modulated thereon.]

9. Apparatus for detecting the presence within a surveillance zone of a body of high permeability material wherein a transmitter is coupled to a first coil element for establishing in said zone an AC magnetic field, and a receiver is coupled to a second coil element for detecting a predetermined disturbance to said field caused by the presence of said body within said field, characterized in that said coil elements are mounted respectively on opposite sides of said zone, each element for rotation about a vertical axis, said elements being constructed and arranged to confine to a region straddled by said axes substantially all of said field that is effective for detecting said body.

10. Apparatus according to claim 9, characterized in that said elements are constrained to assume a standby orientation extending across the space between said axes transverse to the path of any body traversing said surveillance zone and are constructed and arranged to move from said standby orientation upon passage of said body whenever said body traverses said zone.

11. Apparatus according to claim 10, characterized in that said coil elements are of generally planar pancake construction and disposed within a respective panel structure, said structures being mounted on said axes as swinging gates, and said standby orientation is such that said structures extend toward each other in a common vertical plane.

12. Apparatus according to claim 11, characterized in that said first coil element is configured as a loop with all of its turns encircling a center point in the same direction and with mirror symmetry about both a vertical and a horizontal axis passing through said point, and said second coil element is configured as a vertically oriented figure eight with the upper and lower halves of the eight electrically balanced with respect to undisturbed magnetic field signals received directly from said first coil element.

13. Apparatus according to claim 12, characterized in that said coil elements have substantially equal external dimensions and said panel structurs are substantially identical in external size and configuration.

14. Apparatus according to claim 11, characterized in that said first and second coil elements are constructed and arranged to minimize the generation, in any electrically conductive material disposed adjacent the boundary of said region, of a third harmonic signal detectable by said receiver.

15. Apparatus according to claim 11, characterized in that said first and second coil elements are constructed and arranged to minimize reception by said receiver of any line frequency signals generated in proximity to said region.

16. Apparatus for detecting, within a surveillance zone confined to a pathway along which a pedestrian is constrained to travel when proceeding between two areas within a building, the presence of an electrical energy responsive marker wherein a transmitter is coupled to an electrical energy field radiator for establishing throughout said zone an AC energy field, and a receiver is coupled to an electrical energy field receptor for detecting a predetermined alteration of said AC energy field caused by the presence of said marker within said AC energy field, characterized in that at least one gate-like structure is mounted on one side of said pathway for rotation to and fro about a vertical axis, said structure being rotatable about said axis between positions respectively barring and permitting passage of said pedestrian along said pathway, and at least one of said radiator and receptor is disposed in said structure, *at least one of said radiator and receptor being movable relative to the other thereof, substantially all of said structure extending horizontally to one side of said vertical axis, said structure being constrained to assume a standby orientation extending across said pathway.*

17. Apparatus for detecting, within a surveillance zone region of an aisle traversed by shopping carts, the presence of an electrical energy responsive marker wherein a transmitter is coupled to an electrical energy field radiator for establishing throughout said zone an AC energy field, and a receiver is coupled to an electrical energy field receptor for detecting a predetermined alteration of said AC energy field caused by the presence of said marker within said AC energy field, characterized in that at least one of said radiator and receptor is disposed in a gate-like structure that is rotatably mounted relative to said aisle for movement between two positions, one of which is transverse to said aisle for barring passage of said cart along said aisle while the other of which is arranged to permit passage of said cart, and said radiator and receptor establish an effective surveillance zone for detecting all said markers that are carried along said aisle past said gate-like structure by a person propelling said cart, *at least one of said radiator and receptor being movable relative to the other thereof, said structure being constrained to assume a standby orientation extending across said aisle.*

18. Apparatus according to claim 17, characterized in that said radiator and receptor are in the form of generally planar pancake coil elements disposed within respective gate-like structures mounted on respective vertical axes as swinging gates constrained to assume said one position as a standby orientation with said structures extending toward each other in a common vertical plane, said coil elements being constructed and arranged to minimize the generation in the electrically conductive material of an adjacent checkout counter of a third harmonic signal detectable by said receiver, and to minimize reception by said receiver of any line frequency components emanating from any cash register at said counter.

19. Apparatus for detecting, within a surveillance zone region of an aisle traversed by shopping carts, the presence of an electrical energy responsive marker wherein a transmitter is coupled to an electrical energy field radiator for establishing throughout said zone an AC energy field, and a receiver is coupled to an electrical energy field receptor for detecting a predetermined alteration of said AC energy field caused by the presence of said marker within said AC energy field, characterized in that at least one of said radiator and receptor is disposed within a gate-like structure mounted for rotation about an axis positioned relative to said aisle for establishing said zone within said aisle and movable between a first position transverse to said aisle for engagement by a shopping cart traversing said aisle and a second position substantially parallel to said aisle for permitting passage of said cart thereby, *at least one of said radiator and receptor being movable relative to the other thereof, said structure being constrained to assume a standby orientation across said aisle.*

20. Apparatus for detecting the presence within a surveillance zone of an electrical energy responsive marker wherein a transmitter is coupled to an electrical energy field radiator for establishing throughout said zone an AC energy field receptor for detecting a predetermined alteration of said AC energy field caused by the presence of said marker within said AC energy field, characterized in that at least one of said radiator and receptor is mounted for rotation about an axis through an arc no greater than 180°, and positioned relative to said zone, for confining to a region substantially entirely on one side of a given plane containing said axis, as it is rotated about said axis, that field which is effective to detect said marker, *at least one of said radiator and receptor being movable relative to the other thereof in a gate-like structure that is mounted for such rotation, said structure being constrained to assume a standby orientation at about a mid-position in said arc of rotation.*

* * * * *

UNITED STATES PATENT AND TRADEMARK OFFICE

CERTIFICATE OF CORRECTION

PATENT NO. : Re. 32,627

DATED : March 22, 1988

INVENTOR(S) : David R. Humble et al.

It is certified that error appears in the above-identified patent and that said Letters Patent is hereby corrected as shown below:

Column 6, line 35, change "is" to -- in --.

--

Signed and Sealed this

Sixteenth Day of August, 1988

*Attest:*

DONALD J. QUIGG

*Attesting Officer*

*Commissioner of Patents and Trademarks*